United States Patent [19]

Nakamura

[11] 4,268,852
[45] May 19, 1981

[54] SYNC GENERATOR FOR A COLOR TELEVISION SYSTEM

[75] Inventor: Takashi Nakamura, Hatano, Japan

[73] Assignee: Sony Corporation, Tokyo, Japan

[21] Appl. No.: 102,975

[22] Filed: Dec. 14, 1979

[30] Foreign Application Priority Data

Dec. 23, 1978 [JP] Japan .................. 53-160590

[51] Int. Cl.³ ............................................. H04N 9/44
[52] U.S. Cl. .................................. 358/17; 358/18
[58] Field of Search .................. 358/17, 18, 19, 20, 358/21 R, 148, 150, 160

[56] References Cited

U.S. PATENT DOCUMENTS 4,024,572 5/1977 Derenbecher ............... 358/18
4,162,508 7/1979 Tatami ......................... 358/18

*Primary Examiner*—Marc E. Bookbinder
*Assistant Examiner*—Michael A. Masinick
*Attorney, Agent, or Firm*—Lewis H. Eslinger; Alvin Sinderbrand

[57] ABSTRACT

In a sync generator for a color television system, a carrier signal having a frequency of four times the color subcarrier frequency $4f_{sc}$ is counted down to produce a color subcarrier signal as well as vertical and horizontal synchronizing signals for an NTSC or PAL-M color system. A color framing signal, which indicates a predetermined point in the four sequentially repeating color fields making up an NTSC color signal, or in the eight sequentially repeating color fields making up a PAL-M color signal, is generated in response to the carrier signal, and a re-timing circuit establishes synchronism between the color subcarrier and the color framing signal. Burst-flag and line odd-even signals are also produced for the PAL-M system.

14 Claims, 31 Drawing Figures

$S_H$ $S\frac{1}{2}H$ $P_A$ $SVO_I$ $SVE_{II}$ $S'VO_I$ $S'VE_{II}$ $P_{BO_I}$ $P_{BE_{II}}$ $P_D$ $SVO_{III}$ $SVE_{IV}$ $S_0(4f_{sc})$ $S\frac{1}{2}H$ $S_{q1}$ $\overline{S_{q1}}$ $S_{q2}$

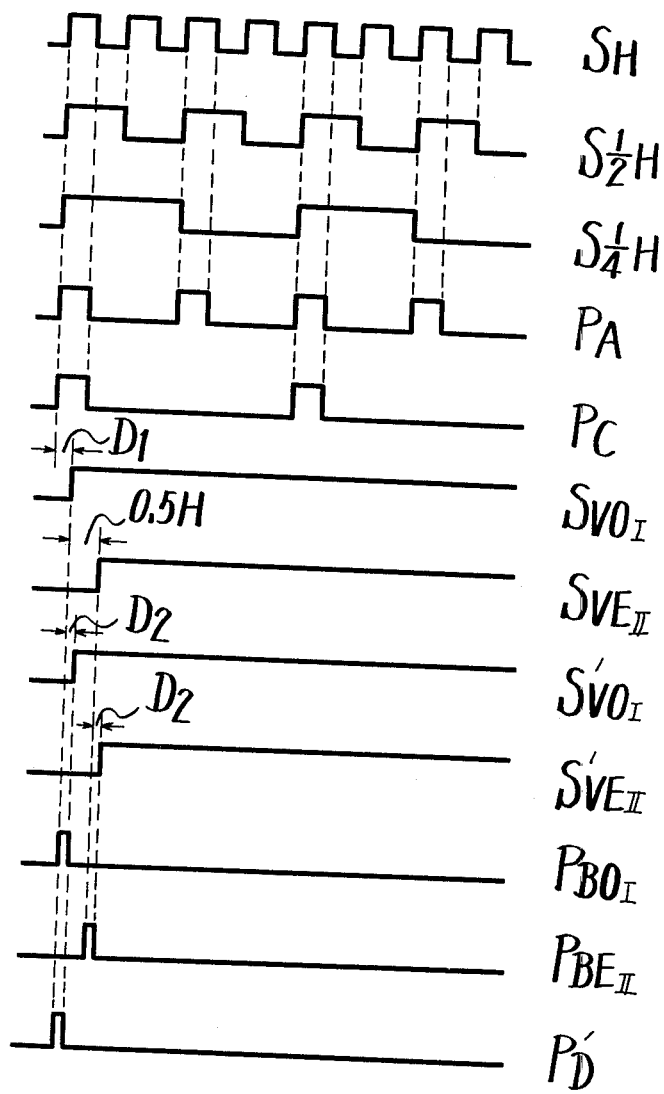

SYNC GENERATOR FOR A COLOR TELEVISION SYSTEM

BACKGROUND OF THE INVENTION

This invention relates to a sync or synchronizing signal generator, and particularly to a sync generator for a color television system applicable to an NTSC or PAL-M system.

It is well known to produce television sync pulses such as, for example, horizontal and vertical sync pulses, by counting down a carrier signal. A carrier signal having a frequency of four times a color sub-carrier frequency $f_{sc}$ may be counted down to produce a color sub-carrier signal $S_{sc}$ having a frequency of $f_{sc}$ and further counted down to produce horizontal and vertical sync signals.

When the power is first turned ON in such a sync generator, the counters thereof may come up in any condition and the relative phases of the color sub-carrier and synchronizing signals begin at random.

As is well known, in the NTSC color television signal, there is an exact frequency relationship between the horizontal synchronizing frequency $f_h$ and the color subcarrier frequency $f_{sc}$, namely $f_{sc}=455/2f_h$, and consequently four television fields must occur before the color subcarrier signal exactly repeats itself in phase with respect to the horizontal synchronizing signal. In other words, the periodicity of the color frame is four fields. Assuming that the color subcarrier signal has is positive peak value at the front edge of the horizontal synchronizing signal, the color subcarrier signal has its negative peak value at the front edge of the next horizontal synchronizing signal. This means that the phase of the subcarrier signal is reversed at every horizontal interval. As a result of the reversal, if the subcarrier has its negative peak value at the front edge of the first equalizing pulse included in the first field of a first frame, the positive peak value of the subcarrier signal occurs at the front edge of the first equalizing pulse included in the first field of the next frame, which immediately succeeds the first frame. In that sense, these two frames are different. It will be evident that if a continuous signal is to be reproduced, splices must join successive frames in the correct sequence; i.e., the first frame must be joined to the second frame. If the first frame is joined to another frame having the same phase relationship between the color subcarrier and the first equalizing pulse as the first frame so as to constitute another "first" frame, there will be a sudden 180° phase shift in the burst or clor subcarrier signals at the splicing point.

The phase of the vertical and horizontal synchronizing signals changes from field to field. In the first field in a frame, the vertical and horizontal synchronizing signals substantially coincide, whereas in the second field in a frame, the vertical synchronizing signal is offset by about 0.5 H where H is a horizontal interval. As described in the in the preceding, an NTSC color television signal consists of four fields in two consecutive color frames sequentially repeating. The first frame, color frame A, contains color field I and color field II, the second frame, color frame B, contains color field III and color field IV. The vertical synchronizing signals of odd-numbered color fields (I and III) employ vertical and horizontal synchronizing signals substantially aligned with each other whereas the even-numbered color fields (II and IV) have the vertical synchronizing signal shifted 0.5 H with respect to the horizontal synchronizing signal as necessary to produce interlaced scanning. The phase of the color sub-carrier signal is the same in color fields II and III and also the same in color fields IV and I. However, the phase of the color sub-carrier in fields II and III is 180° out of phase with the phase of the color sub-carrier in fields I and IV. A PAL-M color signal employs four consecutive frames (eight consecutive fields) sequentially repeating instead of the four used in an NTSC system.

When signals from more than one source such as, for example, a video tape recorder and a television camera, are combined for editing purposes, the editing apparatus requires a color framing signal indicating a starting point in the sequence of color fields (four in NTSC and eight in PAL-M) in order to maintain color synchronization through an editing point.

Merely counting down the vertical frequency to $\frac{1}{4} f_v$ (for NTSC) or $\frac{1}{8} f_v$ (for PAL-M) is not satisfactory for such a color framing signal since, as a result of synchronizing uncertainties arising when the equipment is turned ON, the phase relationships between the vertical and horizontal synchronizing signals as well as between the color sub-carrier signal produced by counting down a carrier signal 4 $f_{sc}$ by $\frac{1}{4}$ and such a counted down vertical frequency, are not determined.

OBJECTS AND SUMMARY OF THE INVENTION

Accordingly, it is an object of the present invention to provide a novel sync generator.

It is another object of the invention to provide a sync generator for use with a color television system.

It is a further object of the invention to provide a sync generator which produces a color framing signal in which the phase relation between the color framing signal and a color sub-carrier is fixed.

According to an aspect of the invention, there is provided a sync generator for a color television system of the type employing a color sub-carrier frequency and a plurality of sequentially repeating color fields comprising means for generating a carrier signal having a frequency an integral number of times the color sub-carrier frequency, means responsive to the carrier signal for generating a color framing signal synchronized with one of the plurality of sequentially repeating color fields, color sub-carrier generating means responsive to the carrier signal for dividing the carrier signal to produce the color sub-carrier frequency, and means for establishing a fixed phase relation between the color sub-carrier frequency and the color framing signal.

The above, the other objects, features and advantages of the present invention, will become apparent from the following description read in conjunction with the accompanying drawings in which like reference numerals designate the same elements.

BRIEF DESCRIPTION OF THE DRAWINGS

FIGS. 5A–5L are waveform diagrams to which reference will be made in explaining the operation of the embodiment of the invention in FIG. 4.

DETAILED DESCRIPTION OF THE PREFERRED EMBODIMENTS

Figure 1:
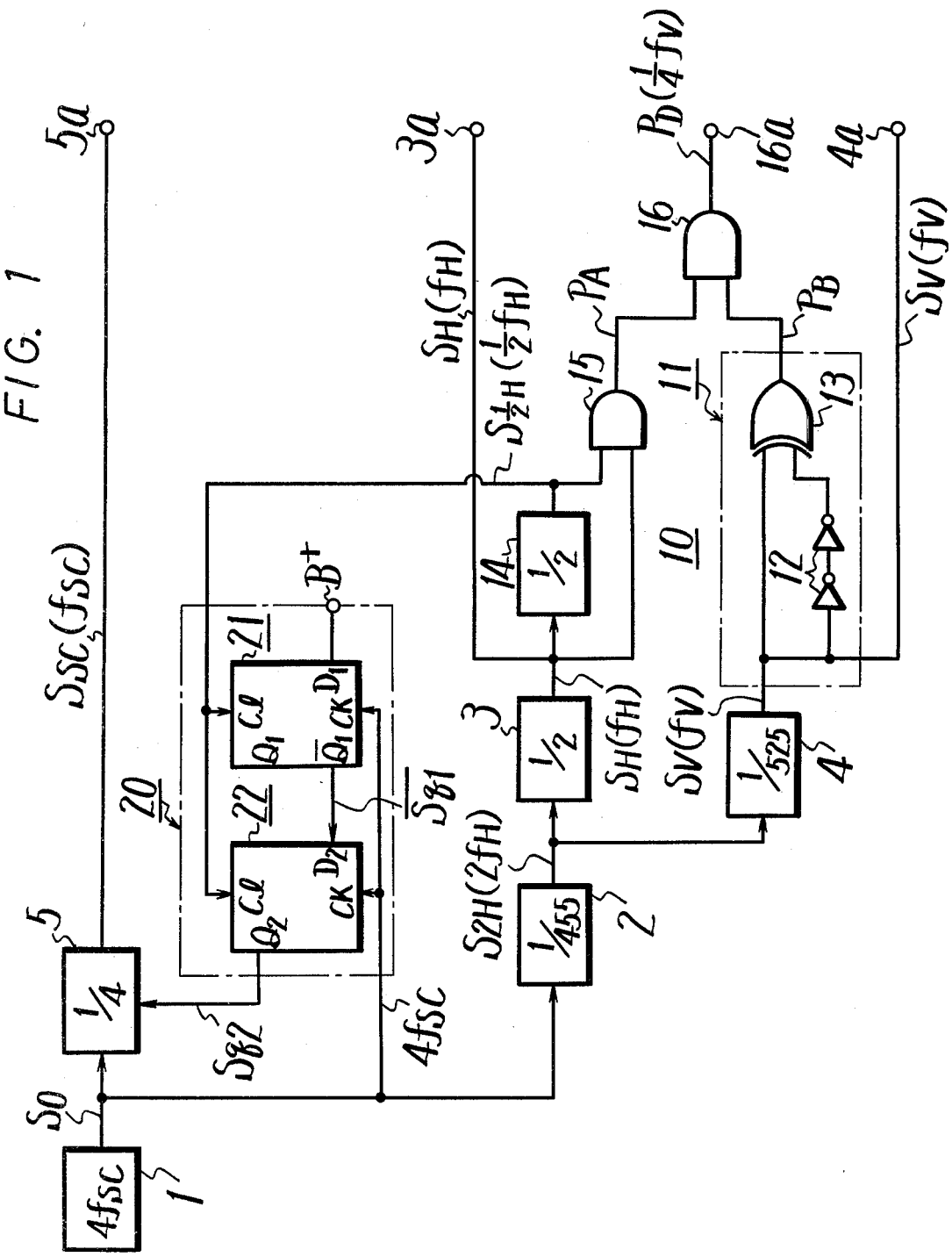
FIG. 1 is a block diagram of a sync generator according to an embodiment of the present invention suitable for use in an NTSC color television system.

Referring to FIG. 1, a sync signal generator according to an embodiment of the present invention is seen, which is adapted to generate sync signals for an NTSC system. An oscillator 1 produces a carrier signal $S_o$ having a frequency of $4f_{sc}$ ($f_{sc}$ is the frequency of a color sub-carrier signal). Carrier signal $S_o$ from oscillator 1 is supplied to a frequency dividing counter 2 which divides carrier signal $S_o$ by 455 and thereby produces a sync frequency signal $S_{2H}$ having a frequency of $2f_H$ which is twice the horizontal frequency $f_H$. Sync frequency signal $S_{2H}$ is supplied to a ½ counter 3 which delivers a horizontal sync frequency signal $S_H$ with a frequency of $f_H$ to an output terminal 3a. The sync frequency signal $S_{2H}$ from frequency dividing counter 2 is also fed to a divider 4 where it is further divided by 525 to produce a vertical synchronizing signal $S_v$ having a frequency equal to the vertical frequency $f_v$ and having a duty cycle of 50%. Vertical synchronizing signal $S_v$ is applied to an output terminal 4a. A ¼ counter 5 counts down carrier signal $S_o$ to produce a color sub-carrier signal $S_{sc}$ consisting of a pulse signal having a duty cycle of 50% and a frequency of $f_{sc}$. Color sub-carrier signal $S_{sc}$ is applied to an output terminal 5a.

The horizontal and vertical sync signals $S_H$, $S_V$ and the color sub-carrier signal $S_{sc}$ are supplied to a sync pulse synthesizer (not shown), such as that disclosed in U.S. Pat No. 4,162,508, which then produces the required horizontal and vertical sync pulses and other sync signals.

A color framing signal generating circuit, shown generally at 10, generates a color framing signal $P_D$ having ¼ the vertical frequency $f_v$. Thus, the frequency of color framing signal $P_D$ is 15 Hz for an NTSC color system. A field identification circuit 11 in color framing signal generating circuit 10 produces a pulse $P_B$ at the beginning of each odd and even field. The vertical sync frequency signal $S_V$ from divider or counter 4 is supplied to one input of an exclusive OR circut 13 in field identification circuit 11. The vertical sync frequency signal is also delayed a constant delay time $D_2$ in a delay circuit 12 and applied to the second input of exclusive OR circuit 13. For the period during which the two inputs of exclusive OR circuit 13 are different (namely delay time $D_2$ following each positive and negative alternation of signal $S_v$) exclusive OR circuit 13 produces a field identification pulse $P_B$. Field identification pulse $P_B$ is applied to an input of an AND circuit 16. An output of AND circuit 16 is applied to an output terminal 16a.

Figure 2A:
FIGS. 2A–2L and 3A–3E are waveform diagrams to which reference will be made in explaining the operation of the embodiment of the invention in FIG. 1.
Figure 2B:
Figure 2C:
Figure 2D:
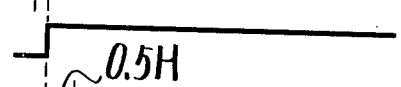
Figure 2E:
Figure 2F:
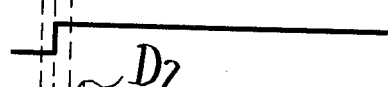
Figure 2G:
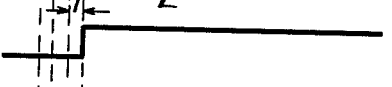
Figure 2H:
Figure 2I:
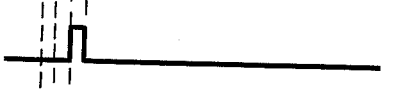
Figure 2J:
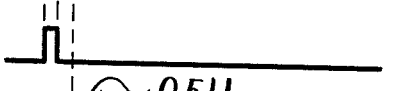
Figure 2K:
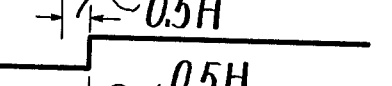
Figure 2L:
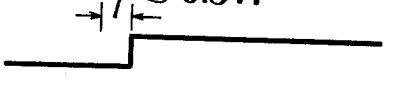

Referring now also to FIGS. 2A–2L, delays in divider 4 delay the positive going transition of the vertical sync signal $S_V$ by a fixed delay time $D_1$ (FIG. 2D) relative to the positive going transition of horizontal sync siganl $S_H$ (FIG. 2A). The vertical sync signal in FIG. 2D is labeled $S_{VOI}$ to indicate that it is the odd vertical sync pulse in the first color field of the NTSC sequence. FIG. 2E shows the relationship of the next vertical sync pulse $S_{VEII}$ which is the even verical sync pulse in the second color field of the NTSC system. It will be noted that the positive going leading edge of vertical sync signal $S_{VEII}$ occurs 0.5 H later relative to the horizontal sync signal $S_H$ than does vertical sync signal $S_{VOI}$. The two vertical synchronizing signals for color fields in the second NTSC frame, $S_{VOIII}$ and $S_{VEIV}$, each retarded 0.5 H from its preceding vertical sync signal, are shown in FIGS. 2K and 2L.

Vertical sync signal $S_{VOI}$ (FIG. 2D) is delayed a fixed delay period $D_2$ by delay circuit 12 to produce a further delayed vertical sync signal $S'_{VOI}$ (FIG. 2F). Vertical sync signal $S_{VEII}$ is similarly delayed to produce a further delayed vertical sync signal $S'_{VEII}$ (FIG. 2G).

The horizontal sync signal $S_H$ from ½ counter 3 is also applied to inputs of a counter 14 and an AND circuit 15. Counter 14 counts down the horizontal sync signal $S_H$ by ½ to produce a signal $S_{\frac{1}{2}H}$ having a frequecy of ½$f_H$ (FIG. 2B) which is applied to a second input of AND circuit 15. AND circuit 15 produces an output $P_A$ (FIG. 2C) which is "1" or high during every second positive alternation of horizontal sync signal $S_H$ (FIG. 2A).

For convenience of description, field identification pulse $P_B$, produced during delay time $D_2$ of delay circuit 12 (FIGS. 2F and 2G), for color frame A of the NTSC system has been separated into odd field identification pulse $P_{BOI}$ for color field I (FIG. 2H) and even field identification pulse $P_{BEII}$ (FIG. 2I) for color field II. It would be clear that odd and even field identification pulses for color fields III and IV would appropriately occur in spaced relation to the signals previously described. Odd field identification pulse $P_{BOI}$ occurs within the time defined by signal $P_A$ (FIG. 2C) to produce color framing signal $P_D$ (FIG. 2J) having a frequency of ¼ $f_V$. Even field identification pulse $P_{BEII}$ (FIG. 2I) occurs while signal $P_A$ (FIG. 2C) is "0" or low. Consequently, even field identification pulse $P_{BEII}$ is blocked or inhibited by AND circuit 16. Similary, corresponding field identification pulses from fields III and IV are also blocked or inhibited by AND circuit 16. Thus, color framing signal $P_D$ (FIG. 2J) occurs only in association with field I of the NTSC color signal.

The color framing signal $P_D$ must have a fixed predetermined phase relationship with the color sub-carrier signal $S_{SC}$. When the power is first turned ON, ¼ counter 5 may come up having any one of its four possible conditions therein. Thus, as ¼ counter 5 is clocked by carrier signal $S_O$, it may have any one of four possible phase relationships to color framing signal $P_D$.

The relationship between the color sub-carrier signal $S_{SC}$ and the horizontal sync signal $S_H$ is expressed as follows:

$$4f_{sc} = 910 f_H$$

$$f_{sc} = 227 f_H + \tfrac{1}{2} f_H \qquad (1)$$

The phase of the color sub-carrier signal $S_{SC}$ thus returns to its original phase every 2 m H (m = 1, 2, 3 . . . and H is the horizontal period). Thus, ¼ counter 5 may be reset or preset by a divided output at the proper time in every other cycle of the horizontal sync signal $S_H$. In the example, a signal $S_{\frac{1}{2}H}$ with a frequency of ½ $f_H$ (m = 1) is utilized to reset or preset ¼ counter 5.

Figure 3A:
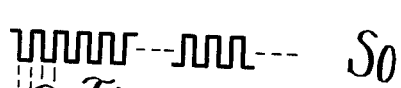

In a practical circuit, counters 2, 3 and 14 divide carrier signal frequency $4f_{sc}$ by appropriate integral values to produce signal $S_{\frac{1}{2}H}$. As a result, due to the existence of the counters, the signal $S_{178\,H}$ experiences a slight delay (such as $\tau_1$ in FIG. 3A) from the occurrence of a positive going or negative going edge of carrier signal $S_O$ (FIG. 3A). The time delay may be different depending upon the particular logic circuits used and also may fluctuate with external factors such as temperature and so on. Since the frequency $\frac{1}{2} f_H$ is very slow relative to carrier frequency $4f_{sc}$, resetting or presetting $\frac{1}{4}$ counter 5 directly with the frequency $\frac{1}{2} f_H$ may not always accomplish reset of $\frac{1}{4}$ counter 5 within a particular cycle of the carrier signal $S_O$. The state of $\frac{1}{4}$ counter 5, which is to be controlled by the signal $S_{\frac{1}{2}H}$, would be different if the time delay $\tau_1$ is less than or greater than one pulse of the carrier signal $S_O$. Therefore, if $\frac{1}{4}$ counter 5 were controlled directly by the signal $S_{\frac{1}{2}H}$ containing such fluctuation, a fixed phase relation could not be ensured between the signals $P_D$ and $S_{SC}$. To overcome this problem, $\frac{1}{4}$ counter 5 is reset or preset by the signal $S_{\frac{1}{2}H}$ after it is, in effect, gated by carrier signal $S_O$ in a re-timing circuit 20. Fluctuations in signal $S_{\frac{1}{2}H}$ can thus be absorbed. As a result, the timing of $\frac{1}{4}$ counter 5 is constant and a constant phase relation is obtained between color sub-carrier signal $S_{SC}$ and color framing signal $P_D$.

Figure 3B:
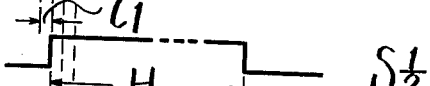
Figure 3C:
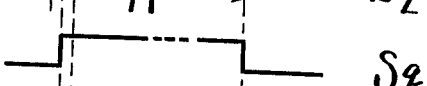
Figure 3D:
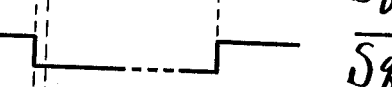
Figure 3E:
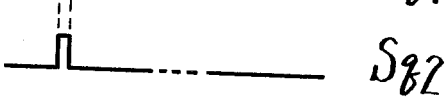

Re-timing circuit 20 produces a control signal for presetting or resetting $\frac{1}{4}$ counter 5 which has a pulse width equal to the width of one clock pulse of carrier signal $S_O$. Two D-type flip-flop circuits 21 and 22 receive the signal $S_{178H}$ from counter 14 a clear terminals C1. Carrier signal $S_O$ is applied to clock terminal Ck of D-type flip-flop circuits 21 and 22. An inverted output $\bar{Q}_1$ of D-type flip-flop circuit 21 is applied to a data input $D_2$ of D-type flip-flop circuit 22. A data terminal $D_1$ of D-type flip-flop circuit 21 is supplied with a DC voltage B+. When the signals $S_{\frac{1}{2}H}$ (FIG. 3B) is supplied to clear terminals C1 after a time delay of $\tau_1$ in counters 2, 3 and 14 from the triggering edge of the reference signal $S_O$ (FIGS. 3A and 3B), inverted output $\bar{Q}_1$ of D-type flip-flop circuit 21 produces a signal $\bar{S}_{q1}$ (FIG. 3D) which becomes "0" after the input of the signal $S_{\frac{1}{2}H}$. A direct output $Q_2$ of flip-flop circuit 22 produces a signal $S_{q2}$ (FIG. 3E) which is synchronized with the first cycle of the carrier signal $S_O$ immediately after the positive-going edge of the signal $S_{\frac{1}{2}H}$.

Re-timing signal $S_{q2}$ may be used to reset or preset $\frac{1}{4}$ counter 5 (for example, to "00"), at a precisely defined time whereby a predetermined phase relation between the color framing signal $P_D$ and the color sub-carrier signal $S_{SC}$ is established. Therefore, if editing is done using color framing signal $P_D$, color synchronization is performed correctly while switching from source to source.

Figure 4:
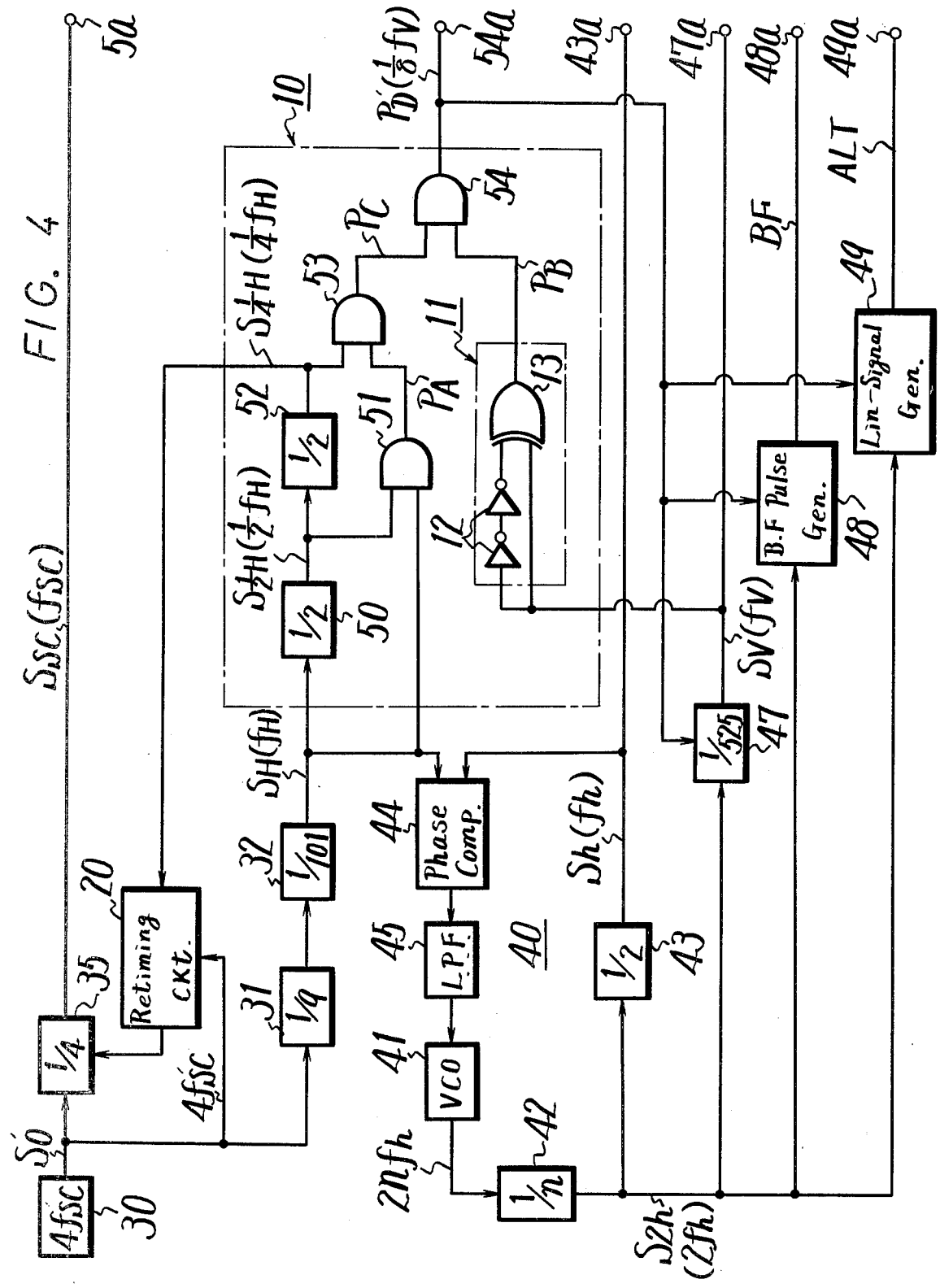
FIG. 4 is a block diagram of a sync generator according to a second embodiment of the invention suitable for use in a PAL-M color television system.

FIG. 4 is an embodiment of the present invention adapted to the PAL-M system. A carrier signal $S'_O$ having a frequency of $4f'_{sc}$ is produced by an oscillator 30. Frequency $f'_{sc}$ in the PAL-M system is slightly different from the frequency $f_{sc}$ in the NTSC system. In the PAL-M system, $4f'_{sc}$ is $909f_H$. The carrier signal $S_O$ from oscillator 30 is counted down by 1/9 in a counter 31 and is further counted down by 1/101 in a counter 32 for a total frequency division by 909 to thereby produce the horizontal sync signal $S_H$ with a frequency of $f_H$. Horizontal sync signal $S_H$ is used internally by circuits in FIG. 4 but is not applied to an output terminal.

Frequency division by a counter is limited to division by an integer. It is therefore impossible to directly produce the vertical sync frequency signal $S_V$ from the output $S_H$ delivered from counter 32 due to the non-integral relation of $2f_H = 525f_v$. Therefore, a signal $S_{2h}$ having a frequency of $2f_h$ ($f_h$ is the horizontal frequency) is produced in a phase locked loop 40. Signal $S_{2h}$ is frequency-divided by 525 in a counter 47 to produce the vertical sync frequency signal $S_V$ which is applied to output terminal 47a.

A voltage controlled oscillator 41 in phase locked loop 40 oscillates at a frequency of $2n f_h$. The output of voltage controlled oscillator 41 is divided by n, where n is an integer, in a counter 42 to produce the signal $S_{2h}$ having a frequency of $2 f_h$. The signal $S_{2h}$ is further divided by 2 in a counter 43 to produce a horizontal sync signal $S_h$ having a frequency of $f_h$. Horizontal sync signal $S_h$ is applied to output terminal 43a. Horizontal sync signal $S_h$ and horizontal sync frequency signal $S_H$ from counter 32 are supplied to a phase comparator 44. The output of phase comparator 44 is supplied through a low pass filter 45 to voltage controlled oscillator 41 as its control voltage. Accordingly, phase locked loop 40 adjusts the phase of the frequency $f_h$ to coincide with that of the frequency $f_H$ thereby locking the phase of signal $S_{2h}$ to the phase of signal $S_H$.

The signal $S_{2h}$ from counter 42 is applied to a conventional BF (burst flag) pulse generating circuit 48 and a line signal (odd-even signal) ALT (alternation) generating circuit 49 which produce a burst flag pulse BF and line signal ALT, respectively, based upon the signal $S_{2h}$. The burst flag pulse is applied to output terminal 48a and the line signal ALT is applied to output terminal 49a. Since circuits 48 and 49 are conventional and do not constitute an inventive part of the present disclosure, detailed descriptions thereof are omitted. Counter 47 and generating circuits 48 and 49 are each reset by the color framing signal $P'_D$ which is produced in a manner to be described later.

The following relationship exists among the color sub-carrier frequency $f'_{sc}$, vertical sync frequency $f_V$ and horizontal sync frequency $f_H$:

$$f'_{sc} = \frac{909}{4} f_H$$

$$= 227 f_H + \frac{1}{4} f_H \qquad (2)$$

$$= \frac{909}{4} \times \frac{525}{2} f_V$$

$$= M f_V + \frac{1}{8} f_V \qquad (3)$$

where M is 59653.

From equation (3) it is seen that the phase of the color sub-carrier signal $S'_{SC}$ returns to its original phase every 8m V (M=1, 2, 3 ... and V is the vertical period). As a result, the color framing signal $P'_D$ for a PAL-M system should occur only once in eight field periods (four frames) as described hereinbelow.

The horizontal sync frequency signal $S_H$ (FIG. 5A) with a frequency of $f_H$ from counter 32 is divided by 2 in a counter 50 of color framing signal generating circuit 10. The divided signal $S_{\frac{1}{2}H}$ having a frequency of $\frac{1}{2} f_H$ (FIG. 5B) from counter 50 and the horizontal sync frequency signals $S_H$ from counter 32 are supplied to an AND circuit 51 which then delivers an output $P_A$ (FIG. 5D) to an AND circuit 53. The signal $S_{\frac{1}{2}H}$ from counter 50 is further divided by 2 in a counter 52 to produce a signal $S_{\frac{1}{4}H}$ having a frequency of $\frac{1}{4} f_H$ (FIG. 5C). Signal $S_{\frac{1}{4}H}$ is fed to an input of AND circuit 53 which then produces an output PC having a period of 4H (FIG. 5E). It should be noted that signal $P_C$ is "1" or positive only during every fourth "1" or positive half cycle of horizontal sync signal $S_H$ (i.e., coinciding with every eighth vertical sync signal).

Delay circuit 12 of field identification circuit 11, produces further delayed vertical sync signals $S'_{VOI}$ and $S'_{VOII}$ (FIGS. 5H and 5I), as well as the remaining six corresponding vertical sync signals (not shown) in a PAL-M sequence, which are applied to exclusive OR circuit 13. Vertical sync signals $S_{VOI}$ and $S_{VEII}$ (FIGS. 5F and 5G) are applied to the other input of exclusive OR circuit 13. Outputs $P_B$, consisting of pulses $P_{BOI}$ and $P_{BEII}$ (FIGS. 5J and 5K) of exclusive OR circuit 13 from field identification circuit 11 begin at the delayed leading edges of vertical sync frequency signals $S_{VOI}$ AND $S_{VEI}$, respectively, and end at the further delayed leading edges of signals $S'_{VOI}$ and $S'_{VEII}$. Signals $P_B$ and $P_C$ are applied to an AND circuit 54 which produces color framing signal $P'_D$ (FIG. 5L) only during the first of the eight consecutive color fields used in the PAL-M sysetm. Color framing signal $P'_D$ is applied to output terminal 54a. Although color framing signal $P'_D$ is described using an example which is aligned with the first of the eight fields in the PAL-M system, alignment with any one of the eight fields is satisfactory for color synchronization with appropriate changes in the circuits which use the outputs of the present invention.

A counter 35 divides the carrier signal $S'_O$ by 4 to produce the color sub-carrier signal $S'_{sc}$ which is applied to output terminal 5a. Counter 35 is preset or reset by a suitable divided signal from color framing signal generating circuit 10. The relation between the color sub-carrier signal $S'_{SC}$ and the vertical sync $S_V$, expressed by equation (2) above, indicates that the phase of the color sub-carrier signal $S'_{SC}$ returns to its original phase every 4 mH (m=1, 2, 3 . . . ) relative to a particular horizontal period H. Therefore, counter 35 may be reset or preset at 4 mH (m=1, 2, 3 . . . ). FIG. 4 illustrates the case where m=1 and the output signal $S_{\frac{1}{2}H}$ from counter 52 resets counter 35. Re-timing circuit 20 is substantially the same as re-timing circuit 20 in FIG. 1, so that its description is omitted.

As described above, according to the present invention, since the signals $S_{\frac{1}{2}H}$ and $S_{\frac{1}{4}H}$, which are respectively produced by frequency division, are used to reset or preset counters 5 and 35, the phase relation among the horizontal sync frequency signal $S_H$ ($S_h$), color sub-carrier signal $S_{SC}$ ($S'_{SC}$), color framing signal $P_D$ ($P'_D$) and the vertical sync frequency signal $S_V$ are initialized to overcome turn-on uncertainties and are thereafter kept constant. Also, since a color framing signal $P_D$ ($P'_D$) is synchronized to a particular frame, if the color framing signal $P_D$ ($P'_D$) together with a color video signal from a camera are supplied to an editor such as a video tape recorder or the like to be used as a control framing signal during editing, color synchronization is maintained through the editing point.

Since the circuit for resetting or presetting counter 5 (FIG. 1) or 35 (FIG. 4) is needed only for a short time after the power is turned ON and is not normally needed thereafter, a switch may be provided to remove the output of re-timing circuit 20 from counter 5 or 35 after initialization is completed.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A sync generator for a color television system of the type employing a color sub-carrier of a predetermined frequency and a plurality of sequentially repeating color fields comprising:

means for generating a carrier signal having a frequency which is an integral number times said predetermined frequency of the color sub-carrier;

framing signal generating means responsive to said carrier signal for generating a color framing signal synchronized with a predetermined one of each of said plurality of sequentially repeating color fields;

color sub-carrier generating means responsive to said carrier signal for dividing said carrier signal to produce said color sub-carrier of said predetermined frequency; and means for establishing a fixed phase relation between said color sub-carrier and said color framing signal.

2. A sync generator according to claim 1; wherein said means for establishing a fixed phase relation includes means for deriving a preset signal related in phase to said color framing signal, and means for applying said preset signal to said color sub-carrier generating means.

3. A sync generator according to claim 2; wherein said integral number is 4, said color sub-carrier generating means includes a ¼ counter and said preset signal is effective to preset said ¼ counter to a predetermined condition.

4. A sync generator according to claim 3; wherein said color television system is an NTSC color television system, and said color framing signal is effective to identify a predetermined one of each four sequential color fields of said NTSC color television system.

5. A sync generator according to claim 4; wherein said framing signal generating means includes 1/455 counter means receiving said carrier signal and 1/525 counter means connected in series with said 1/455 counter means, said 1/455 counter means being effective to generate a signal having a frequency of 2 times a horizontal sync frequency, and said 1/525 counter means being effective to generate a signal having a frequency equal to a vertical sync frequency.

6. A sync generator according to claim 5; further including first and second series-connected ½ counters receiving an output of said 1/455 counter means, an output of said first and second series-connected ½ counters being fed to said ¼ counter of said color sub-carrier generating means.

7. A sync generator according to claim 6; wherein said framing signal generating means further includes a field identification circuit receiving an output of said 1/525 counter means and operative in response thereto to produce a field identification signal, and said framing signal generating means employs outputs of said first and second series-connected ½ counters, and said field identification signal for generating said color framing signal.

8. A sync generator according to claim 1; wherein said means for deriving a preset signal includes a re-timing circuit, and said re-timing circuit is effect to re-time said color sub-carrier generating means.

9. A sync generator according to claim 8; wherein said color television system is a PAL-M color television system, and said color framing signal is effective to identify a predetermined one of each eight sequential color fields of said PAL-M color television system.

10. A sync generator according to claim 9; wherein said framing signal generating means includes countdown means for counting down said carrier to a horizontal sync frequency signal, and a phase locked loop phase locked to said horizontal sync frequency signal for generating a signal which is an integral multiple of a vertical sync frequency signal.

11. A sync generator according to claim 10; wherein said framing signal generating means further includes first and second series-connected ½ counters receiving said horizontal sync frequency signal, an output thereof being said preset signal.

12. A sync generator according to claim 11; wherein said signal which is an integral multiple of a vertical sync frequency signal is a signal having a frequency of twice said horizontal sync frequency signal and said 1/525 counter means is responsive to said last mentioned signal to produce said vertical sync frequency signal.

13. A sync generator according to claim 12; further including a field identification circuit responsive to said vertical sync frequency signal for producing field identification pulses, said framing signal generating means being responsive to said horizontal sync frequency signal, outputs of said first and second series-connected ½ counters and said field identification pulses for generating said color framing signal.

14. A sync generator according to claim 13; wherein said color framing signal is effective to preset said 1/525 counter.

* * * * *